United States Patent [19]

Fasching et al.

[11] Patent Number: 5,144,251

[45] Date of Patent: Sep. 1, 1992

[54] THREE-AXIS PARTICLE IMPACT PROBE

[75] Inventors: George E. Fasching; Nelson S. Smith, Jr.; Carroll E. Utt, all of Morgantown, W. Va.

[73] Assignee: The United States Department of Energy, Washington, D.C.

[21] Appl. No.: 679,488

[22] Filed: Apr. 2, 1991

[51] Int. Cl.$^5$ ............................................. G01R 27/26
[52] U.S. Cl. ................................. 324/661; 324/688; 324/690; 73/861.73
[58] Field of Search ............................ 324/660–662, 324/681, 686–688, 690; 273/148 B; 341/20, 33; 200/6 A, 61.41, 61.42, 600; 74/471 XY; 340/870.37, 709; 73/59, 861.41, 861.73, 861.71, 862.62, 862, 64, 862.68, 862.04, 198; 361/283, 285, 291

[56] References Cited

U.S. PATENT DOCUMENTS

| | | | |
|---|---|---|---|
| 4,498,043 | 2/1985 | Heathcote et al. | 324/662 |
| 4,719,538 | 1/1988 | Cox | 361/283 |
| 4,788,869 | 12/1988 | Li | 73/861.71 |
| 5,006,952 | 4/1991 | Thomas | 361/283 |

OTHER PUBLICATIONS

Birchenough et al, Local particle velocity measurements with a laser anemometer in an upward flowing gas-solid suspensions, powder technology 14(1):139-152 Dec., 1976.
Irons et al, Particle fraction and velocity measurement in gas-powder streams by capacitance transducers, Int. J of Multiphase Flow pp. 289-297 Dec., 1983.
Mann et al, Flow measurement of coarse particles in pneumatic conveyers, Ind. and Eng. Chem., Process Design and Dev. pp. 9-13 Dec., 1977.
Raso, et al, An Impact Probe for local analysis of Gas--Solid Flows, Powder Tech. pp. 151-159, Dec., 1983.
Smith et al, Investigation of particle velocities in a gas--solid system, Amer. Inst. of Chem. Eng. pp. 313-316 Feb., 1986.
Satkel et al, Turbulent flow of suspension into a channel, Powder Tech. pp. 279-289, Dec., 1969.

*Primary Examiner*—Jack B. Harvey
*Attorney, Agent, or Firm*—David E. Breeden; Stephen D. Hamel; William R. Moser

[57] ABSTRACT

Three-axis particle impact probes detect particle impact vectors along x-, y-, and z-axes by spherical probe head mounted on the outer end of a shaft that is flexibly mounted in silicone rubber at the top of a housing so as to enable motion imparted to the head upon impact to be transmitted to a grounded electrode secured to the shaft within the housing. Excitable electrodes are mounted in the housing in a fixed position, spaced apart from the ground electrode and forming, with the ground electrode, capacitor pairs. Movement of the ground electrode results in changes in capacitance, and these difference in capacitance are used for measurement or derivation of momentum vectors along each of the three axes. In one embodiment, the ground electrode is mounted at the base of the shaft and is secured to a silicone rubber layer at the top of the housing, providing for cantilevered movement. In another embodiment, the shaft is mounted at its mid point in a flexible bushing so that it undergoes pivotal movement around that point.

10 Claims, 5 Drawing Sheets

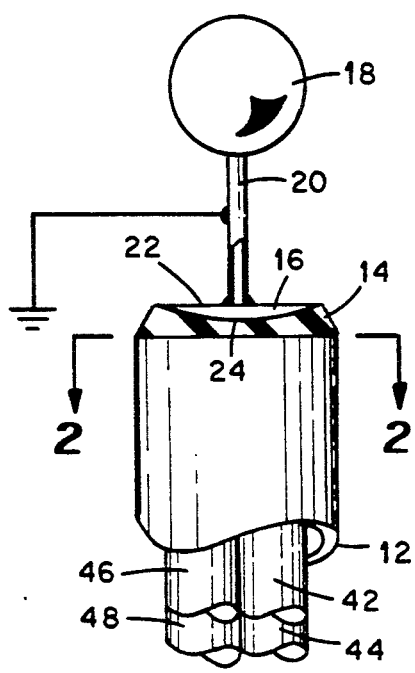
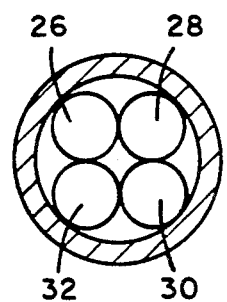
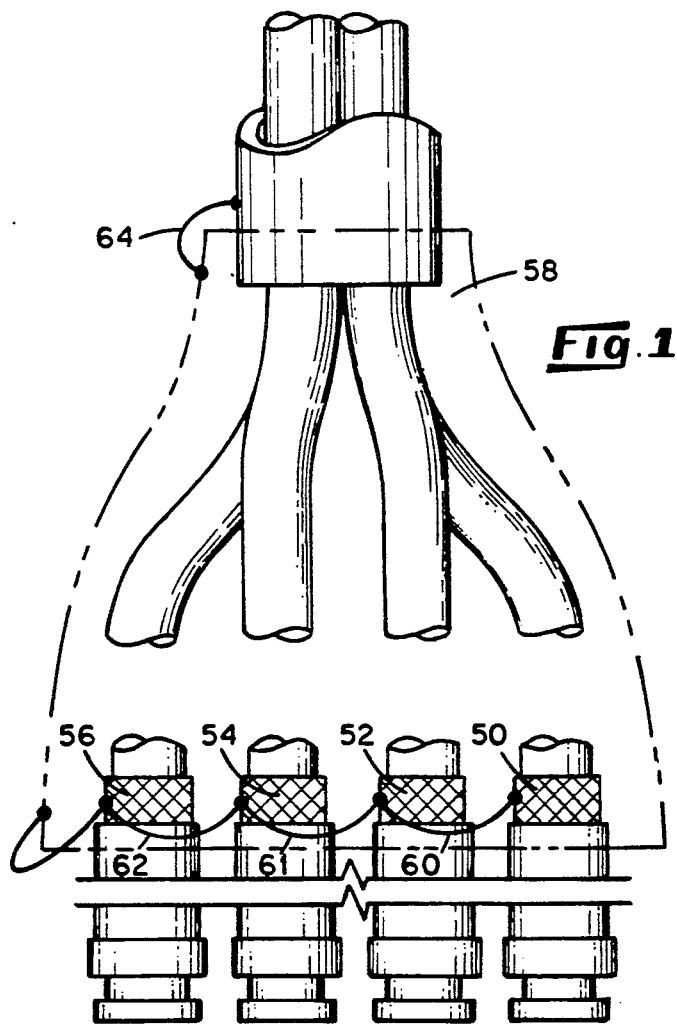
Fig. 1
Fig. 2

THREE-AXIS PARTICLE IMPACT PROBE

FIELD OF THE INVENTION

This invention relates generally to instruments for monitoring the dynamic behavior of particles and more particularly to particle impact probes.

BACKGROUND OF THE INVENTION

Measuring the parameters associated with solid-fluid flow systems has been interesting to researchers in areas such as pneumatic solids transport, slurry flow, air quality monitoring, and most recently, fluidized-bed combustion and gasification. Many different fundamental principles have been applied in attempts to provide one or more measures of parameters associated with the dynamic behavior of gas-solids flows.

Stukel and Soo (1969) used isokinetic samplings of a 10-micrometer ($\mu$m) magnesia particle-air mixture to determine local mass flow ($\rho v$) and a fiber optic probe to measure the local particle density ($\rho$). They used the ratio of these two quantities to give the value of the local particle velocity (v).

The studies of Gillespie and Gunter (1959) indicate that entrained particles as large as 50 to 400 $\mu$m have little effect on the air-particle flow pattern. This suggests that the mean force, exerted on a surface placed normal to the direction of flow, could be used as a measure of dust concentration and that a solids pressure device based on this principle should be feasible. Mann and Crosby (1977) determined the local flow characteristics of coarse particles in pneumatic conveyors by using a piezoelectric transducer. The parameters measured include local particle flow rate, local average particle velocity and local velocity distribution.

Birchenough and Mason (1976) used a laser anemometer, based on the Doppler effect, to obtain particle axial velocity profiles in two-phase, gas-solid flows. The system was intended for use in those instances where the flow stream had a particle concentration low enough for laser penetration through the volume to be monitored.

Irons and Chang (1983) used capacitance measurements between electrodes mounted on the surface of a flow-containing pipe to measure average void fractions and particle velocities with errors believed to be less than eight percent. Smith and Klinzing (1986) used another electrically based approach. They recorded the current flow to two electrodes, which were separated by a known distance along the direction of flow. The two current values were produced by the loss of the frictionally generated charge on the entrained particles upon collision with the electrodes. The two-electrode current data were processed using cross-correlation techniques to obtain a measure of the average particle velocity.

A one-axis impact probe using strain-gauge-based particle detection was developed by Raso, Tirabasso, and Donsi (1983). In this device, the strain gauge senses impacts imparted to a thin, hollow rod probe. The probe was made smaller for low intrusiveness and provided measures of local particle concentration and velocities in gas streams. The probe was sensitive to the impact of single particles, and its small size allowed its measurement to be good approximations to point values. However, restriction to sensing of particle impact along a single axis limits the amount of data obtainable with such a probe device. Desired features for an improved measuring device include a capability for measuring or deriving particle impact momentum vectors along three axes so as to enable generation of better data bases and for determining solid pressure gradients within a cold fluidized bed. Such data is fundamental to mechanistic mathematical models for fluidized bed particle dynamics prediction.

SUMMARY OF THE INVENTION

The present invention is directed to a three-axis particle impact probe having a sensor head mounted on one end of a shaft such as a hollow tube and a grounded electrode disposed on the other end of the shaft. The shaft is flexibly mounted at the top of or within a housing in a manner such that movement of the shaft imparted by particle impact is transmitted to the electrode holding end. A plurality of excitable electrodes are disposed in the housing in spaced-apart relation to the grounded electrode and arranged such that the distance between the grounded electrode and the excited electrodes is varied upon particle impact, producing a change in capacitance across facing electrodes. Electrical signals proportional to x, y, and z components of particle momentum imparted to the particle head are generated through such capacitance changes. Means are provided for exciting the electrodes and for amplifying and processing capacitance-derived signals to provide output voltages proportional to the three components of particle momentum. In one embodiment, the ground electrode takes the form of an arcuate disc mounted at the top of the housing in a pad of elastomeric material, and the four excitable electrodes are disposed co-planar with one another and spaced apart below the ground electrode. In this embodiment, motion of the shaft upon particle impact is cantilevered around the disc at the base of the shaft. Four excitable electrodes are provided, $x_1$, $x_2$, $y_1$, and $y_2$. Differential current changes across the electrode may be combined to form x- and y- signals, with a z- axis signal being obtainable by addition of currents across the excited electrodes. In another embodiment, the shaft is mounted so as to extend downward inside the housing and is flexibly supported by an elastomeric bushing near the middle of its length. When the probe is impacted, the shaft pivots around its support point and/or moves up and down. Three electrodes, one each for x, y, and z axes, are located at the shaft base spaced apart from fixed, excitable x, y, and z electrodes in the housing. Signals for each axis are obtained from capacitance changes across the three facing pairs of electrodes.

Impact probes embodying the invention provide a capability for three-axis solid pressure gradient measurements for dense fluidized bed conditions as well as for single impact momentum vector movements for dilute bed conditions. These probes may be made in small sizes such as to minimize intrusiveness while exhibiting high sensitivity and three-axis capability. The sensor head may be custom designed to match the characteristics of the particles in a particular system.

It is, therefore, an object of this invention to provide a particle impact probe having a capability for measuring particle impact vectors along three axes.

Another object is to provide such a probe with a capability for making three-axis, solids-pressure-gradient measurements for dense fluidized conditions.

Yet another object is to provide an impact sensor that may be made in a small size so as to minimize its intrusiveness while maintaining a high sensitivity.

Other objects and advantages of the invention will be apparent from the following detailed description and appended claims.

BRIEF DESCRIPTION OF THE DRAWINGS

FIG. 1 is a side view, partly broken away, showing an impact probe embodying the invention.

FIG. 2 is a sectional view taken along line 2—2 of FIG. 1.

DESCRIPTION OF THE PREFERRED EMBODIMENT

Figure 3:
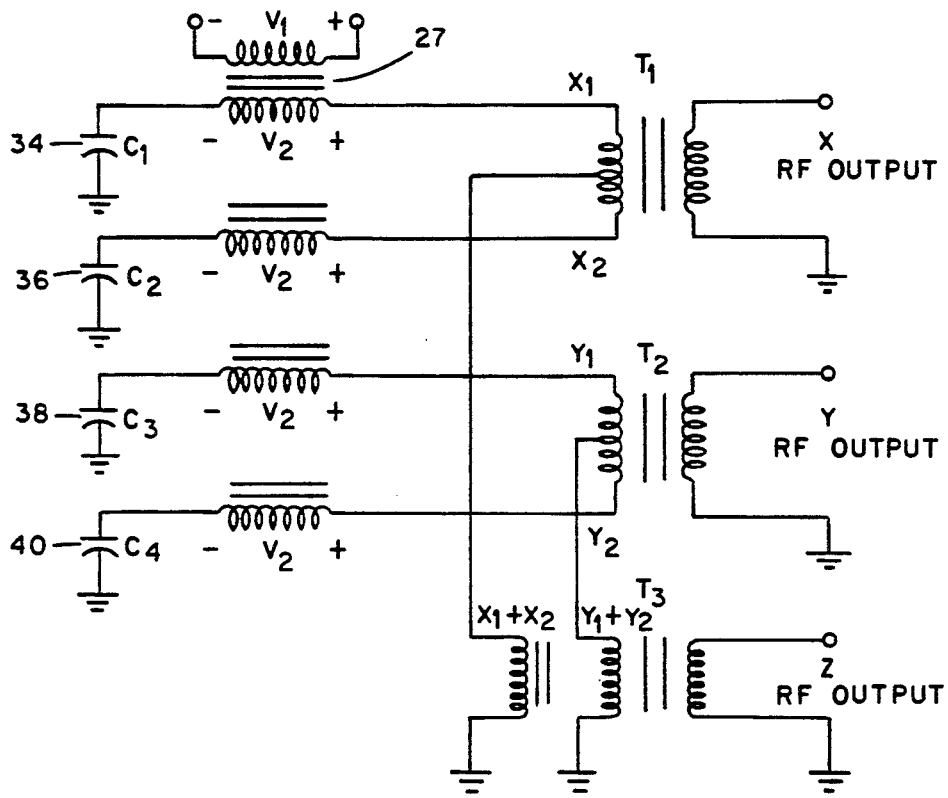
FIG. 3 is a schematic view showing signal and excitation transformer interconnections.

Referring to FIG. 1 of the drawings, an impact probe 10 embodying the invention is shown. The probe has a tubular housing 12 which may comprise a stainless steel tube having a diameter such as 1/16" or ⅛". A flexible pad 14 of elastomeric material such as silicone rubber is disposed at the top of and extending across the housing. Ground electrode 16, mechanically coupled to probe head 18 by shaft 20, is secured to the flexible layer so as to provide an elastic, spring-like mounting allowing particle impacts on head 18 to produce cantilever-type movement of ground electrode 16. The pad is designed so that when a particle strikes the sensor head, and the head moves a distance with a rise time and in a direction dependent upon impact momentum vectors, the pad will allow the ground electrode to undergo elastic axial motion (z-axis) and elastic rotational, x- and y-axis motion. Probe head 18 is preferably provided in the form of a hollow metal or plastic sphere which may have a diameter such as 1/16" to ⅛", and it may be tailored in shape, size, and density to match particles of a particular fluidized bed or be otherwise optimized. Shaft 20 preferably comprises a thin stainless steel tube having a diameter of 0.013" and a length of 0.25". Ground electrode 16 may be a circular metal disc having a flat top surface 22 and an arcuate lower surface 24 obtained by machining to produce a gradual decrease in thickness from the center to the outer edge of the disc. This shape minimizes the chance of rubber penetration by corners or edges of the electrode at large electrode deflections and serves to linearize capacitance-deflection characteristics.

Four sensing electrodes 26, 28, 30, and 32 (FIG. 2) are disposed within the housing at the top end and fixed in place, co-planar with one another and spaced apart from ground electrode 16 so as to provide four capacitors, 34, 36, 38, and 40 (FIG. 3), one of each being formed between the moving ground electrode and a sensing electrode. The sensing electrodes are made up of flat, polished end surfaces of four wires 42, 44, 46, and 48 secured in place by means such as being embedded in epoxy resin. The wires are threaded downward and out the lower end of the housing and are connected to coaxial cables 50, 52, 54, and 56. Electromagnetic shielding is provided in a conventional manner by shielding tape 58 wrapped around the wires and conductive wires 60, 61, and 62 connecting the braided shields of the four cables and wire 64 connected to the base of the housing. The co-axial cable ends are disposed for being individually connected to signal transformers as shown in FIG. 3. Each of the four sensing electrodes is energized by an excitation transformer 25 as shown in FIG. 3. The excitation transformer may have a single primary winding of seven turns and four separate secondary windings, one for each sensing electrode, of 35 turns.

FIG. 3 shows each of the capacitors 34, 36, 38, and 40 being separately excited by the secondary voltages, $V_2$, produced by a common primary voltage, $V_1$, which may be a 400-kilohertz (kHz), 50-volt, peak-to-peak sinusoidal signal. The 400-kHz x, y, and z sinusoidal output signals are generated using the excitation and signal transformer interconnections shown in FIG. 3. These implement the following equations for the three rf output signals:

$$x = x_1 - x_2 \quad (1)$$

$$y = y_1 - y_2 \quad (2)$$

$$z = x_1 + x_2 + y_1 + y_2 \quad (3)$$

where $x_1$, $x_2$, $y_1$, and $y_2$ are the currents to ground through capacitors 34, 36, 38, and 40, respectively, produced by the common 400-kHz voltage source, $V_2$. If the thickness of the rubber layer between each of the four sensing electrodes and the ground electrode is the same, then the capacitances for the four capacitors are all equal, and $x_1$, $x_2$, $x_3$, and $x_4$, the resulting capacitance currents, are all equal to a common value, $i_o$. When a particle impact causes probe head motion, the thickness of rubber above each sensing electrode is subjected to a sudden change, which then relaxes by amplitude-decaying oscillation to the unstressed pre-impact thickness. Consider a particle impact that produces ground electrode motion such that the four capacitance signals become:

$$x_1 = i_o + \Delta x + \Delta z \quad (4)$$

$$x_2 = i_o - \Delta x - \Delta z \quad (5)$$

$$y_1 = i_o + \Delta y + \Delta z, \text{ and} \quad (6)$$

$$y_2 = i_o - \Delta y + \Delta z \quad (7)$$

where $\Delta x$ is the current change produced by rubber thickness change above the $x_1$ and $x_2$ electrodes by rotation of the ground electrode. $\Delta y$ is the current change produced by a similar rubber thickness change above the $y_1$ and $y_2$ electrodes, and $\Delta z$ is the common rubber thickness change produced above all four sensing electrodes by longitudinal translation of the ground electrode. Using the set of equations 4-7 in equations 1-3 produces:

$$x = 2\Delta x \quad (8)$$

$$y = 2\Delta Y \quad (9)$$

$$z = 4i_o + 4\Delta z \quad (10)$$

The Δ term n each of these equations is a 400-kHz sinusoidal signal with an amplitude that is directly proportional to its particular sensing electrode capacitance ($C_1$, $C_2$, $C_3$, or $C_4$). That is, the outputs are 400-kHz signals that are amplitude-modulated by the decreasing oscillatory motion of the ground electrode, which is produced by particle impact. Signals proportional to the x, y, and z components of particle momentum are obtained at the outputs of signal transformers $T_1$, $T_2$, and $T_3$, as shown in equations 8, 9, and 10. Note that the x and y signals are governed by the rotational parameters of the probe, while the z signal is governed by the translational parameters.

Figure 4:
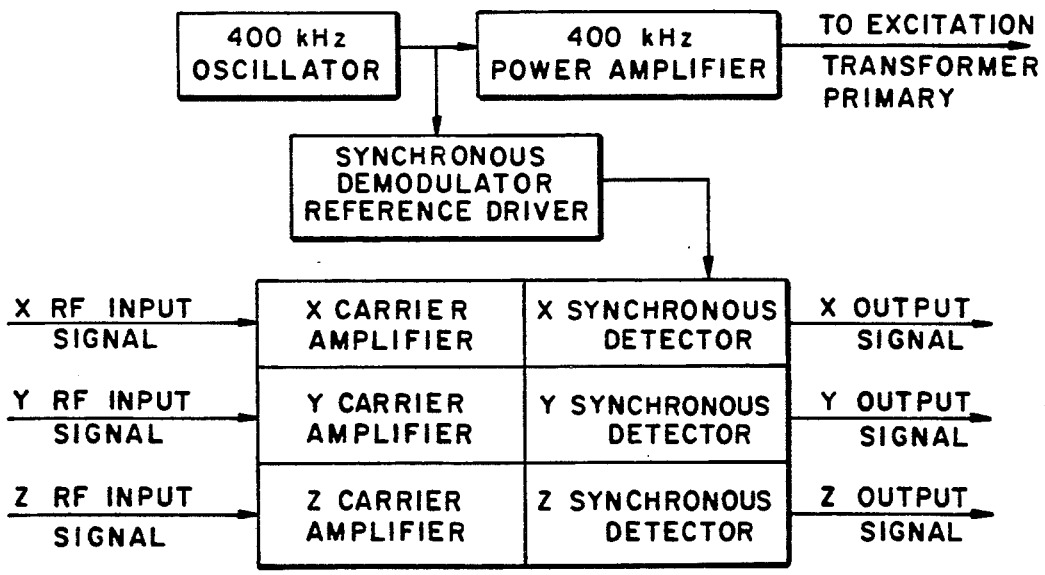
FIG. 4 is a block diagram showing signal processing features of the impact probe.
Figure 5:
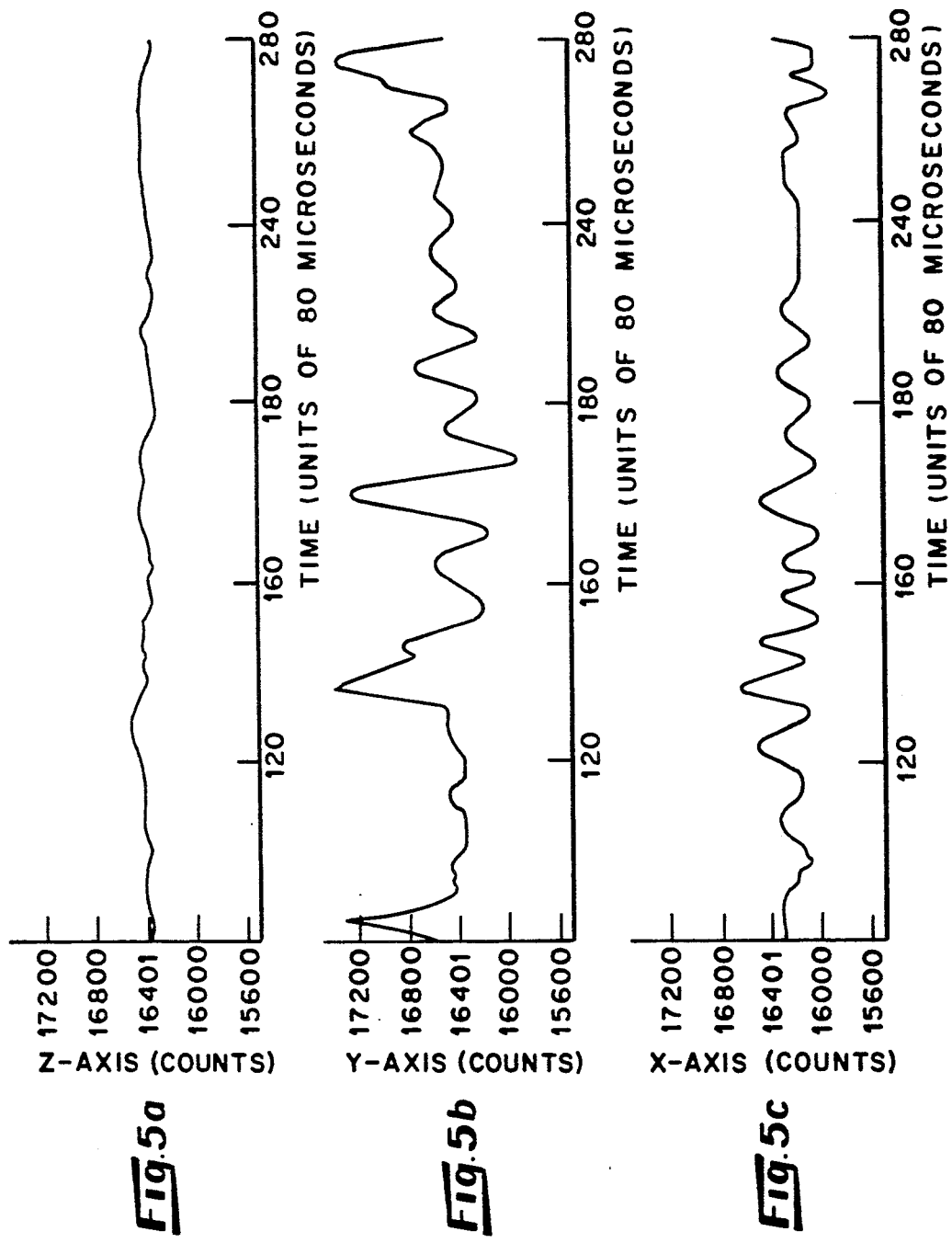
FIG. 5, which is made up of FIGS. 5a—5c, illustrates a typical 3-axis response with time for the probe positioned in a fluidized bed.

FIG. 4 illustrates in block diagram the electronic system used to process the x, y, and z rf signals. The output of a crystal-based, 400-kHz oscillator serves as the input to the power amplifier and the synchronous-demodulator, reference-signal amplifier. The output of the power amplifier serves as the input to the primary winding of excitation transformer $T_4$, shown in FIG. 3, and produces a peak-to-peak voltage of 500 volts on each of the four secondary windings. These 500-volt, 400-kHz voltages serve as the driving source in the $C_1$, $C_2$, $C_3$, and $C_4$ signal-producing circuits. The resulting x, y, and z signals in FIG. 4 are derived from signal transformers $T_1$, $T_2$, and $T_3$, which implement equations 1, 2, and 3. These signals are amplified as shown in FIG. 4. The signals are then synchronously detected to provide the output voltages x, y, and z that are proportional to the three components of particle momentum. Typical dense bed x, y, and z output voltages are shown in FIG. 5.

Figure 6:
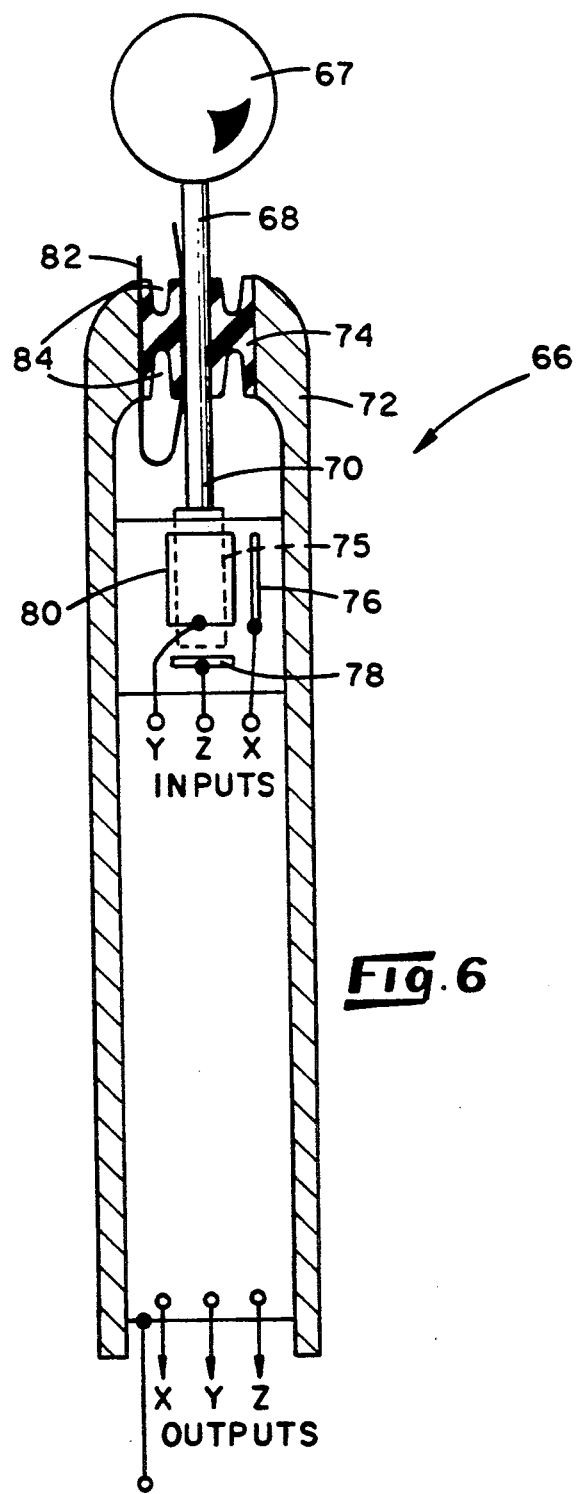
FIG. 6 is a schematic view showing an alternate embodiment of the invention.
Figure 7:
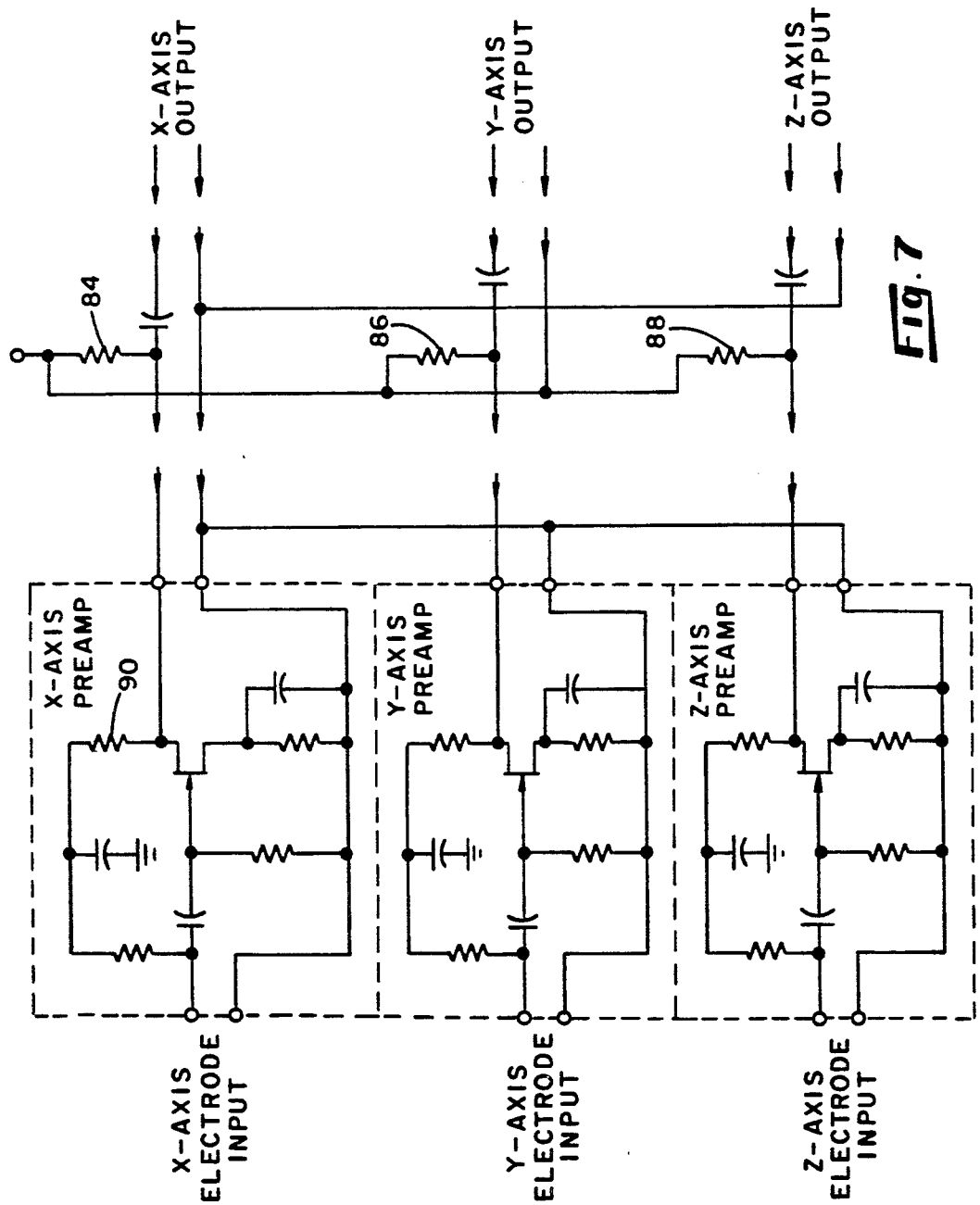
FIG. 7 is a circuit diagram showing signal processing features for the alternate embodiment.

FIGS. 6 and 7 show an alternate embodiment of an insert probe 66 wherein a probe head 67 is mounted at the top of shaft 68, and the base 70 of the shaft extends downward into support housing 72. The shaft is mounted near its middle in a flexible bushing 74, which may be made of silicone rubber. Instead of moving in a cantilevered manner around a pivotal point at the base of the shaft as in the embodiment described above, the shaft in this embodiment is balanced so as to pivot at or near the middle of its length when a particle impacts the probe head. The base region of the shaft has a grounded electrode region 75 arranged to be movable along x, y, and z axes responsive to particle impact. Electrodes 76, 78, and 80 in the form of metal plates are connected to housing 72 by means not shown, the plates being spaced apart from electrode region 75 of the shaft so as to define capacitors for each of the three axes. Shaft 68 is connected to ground wire 82 to ground the moving electrode at the base of the shaft. Fixed electrodes 76, 78, and 80 are D.C. excited through signal output lines as shown in FIG. 7.

A 40-volt D.C. excitation may be applied to the x, y, and z electrodes through the preamplifier load resistors 84, 86, and 88, which may have a value of 4.7K ohms, and input resistor 90, which may have a value of 1 megohm, as shown in FIG. 7. When a bed particle strikes the sensor head, the head will move a distance and in a direction dependent upon the impact momentum vector. The rubber bushing is designed to allow axial motion (z-axis) and rotational (pivotal) motion. The rotation is transformed into x-axis and y-axis deflection at the sensor electrodes. When the grounded electrode moves, the charged field electrodes (x, y, and z) undergo a change in voltage as a result of the change in capacitance or $$\Delta V \approx \frac{Q}{\Delta C},$$

where Q is the electrode charge, $\Delta C$ is the change in electrode capacitance with motion, and $\Delta v$ is the resulting voltage change of signal.

The preamplifiers present a high input impedance to the electrode signal sources to minimize source loading. They also amplify the signals with a gain of 10 approximately and drive the long output signals cables with a low output impedance.

The three preamps preferably are miniaturized to fit within the housing by utilizing chip transistors, capacitors, and resistors in surface mount construction to minimize the probe size and its intrusiveness.

The resulting output signals are bipolar impulses due to the capacitive coupling at the preamp input and output. The x, y, and z impulse signals with proper scaling represent the axis components that define the impact vector associated with each particle impact.

The mounting bushing as shown in FIG. 6 may be provided with grooves 84 to give more flexibility for pivoting x and y axis motion and for axial (z axis) motion. Shaft 68 is preferably balanced about its pivot point at the rubber bushing to reduce x- and y- sensitivity to vibration. Input and output signal leads are shielded to prevent cross talk.

While the invention is illustrated with reference to specific embodiments described above, it is not to be understood as limited to these embodiments but is limited only as indicated by the appended claims.

We claim:
1. A three-axis particle impact probe comprising:
   a tubular housing having disposed across one end thereof a layer of flexible, non-conducting material;
   a shaft having an exposed impact sensing head fixedly mounted at one end thereof and a ground electrode fixedly mounted to and transverse to its other end, said ground electrode being secured to said flexible layer and arranged for cantilevered movement of the shaft and attached electrode in response to movement of the head produced by particle impact;
   a plurality of sensing electrodes disposed in a planar array traversing the end of said housing adjacent to said flexible layer, said grounded electrode and said sensing electrodes being spaced apart on opposite faces of said flexible material and forming capacitors between the ground electrode and each of the sensing electrodes, the distance between the ground electrode and sensing electrodes being changeable responsive to particle impact;
   means for exciting said sensing electrodes;
   means for obtaining signal outputs responsive to changes in capacitance resulting from movement of the ground electrode; and
   signal output processing means enabling x-, y-, and z-axis components of particle impact vectors to be determined.

2. An impact probe as defined in claim 1 wherein said ground electrode comprises a circular disc having an arcuate shape defined by a thicker region at its center and progressively thinner regions extending radially outward.

3. An impact probe as defined in claim 2 wherein said sensing electrodes comprise flat ends of wires embedded in said housing.

4. An impact probe as defined in claim 3 wherein said sensing electrodes include four electrodes symmetrically disposed around the center of said housing, two of the electrodes disposed across from one another and arranged to undergo capacitance changes responsive to movement of the sensing head along an x-axis and the other two disposed across from one another and arranged to undergo capacitance changes responsive to movement of the sensing head along a y-axis.

5. An impact probe as defined in claim 4 wherein said means for exciting said sensing electrodes comprises a transformer.

6. An impact probe as defined in claim 5 wherein said sensing head comprises a hollow spherical body.

7. An impact probe as defined in claim 6 wherein said transformer includes secondary windings and wherein said wires extend through said housing and out of a second end thereof and are disposed for coupling with said secondary windings of said transformer.

8. An impact probe as defined in claim 7 wherein said means for obtaining said signal outputs comprises transformers coupled with means for detecting changes in current values due to capacitance changes and providing rf signal outputs.

9. An impact probe as defined in claim 8 including means for subtracting a second rf signal value obtained for a second x-axis electrode from a first rf signal value obtained for a first x-axis electrode to produce an x-output signal and means for subtracting a second rf signal value obtained from a second y-axis electrode from a first rf signal value obtained from a first y-axis electrode to obtain a y-axis signal output.

10. An impact probe as defined in claim 9 including means for adding signal values from each of the sensing electrodes to obtain a z-axis signal output.

* * * * *